United States Patent [19]
Pesuit

[11] Patent Number: 5,835,926
[45] Date of Patent: Nov. 10, 1998

[54] MULTIPLE MEMORY ADDRESSING USING ADJUSTABLE CHIP SELECT

[75] Inventor: Edward Wayne Pesuit, Pleasanton, Calif.

[73] Assignee: Siemens Business Communication Systems, Inc., Santa Clara, Calif.

[21] Appl. No.: 631,039

[22] Filed: Apr. 12, 1996

Related U.S. Application Data

[63] Continuation of Ser. No. 990,724, Dec. 15, 1992, abandoned.

[51] Int. Cl.$^6$ .......................................................... G06F 12/00
[52] U.S. Cl. ........................ 711/1; 711/2; 711/5; 711/201; 711/202
[58] Field of Search .................................... 395/411, 412, 395/413, 401, 410, 402, 405, 427; 711/1, 2, 5, 100, 201, 202

[56] References Cited

U.S. PATENT DOCUMENTS

| | | | |
|---|---|---|---|
| 3,742,458 | 6/1973 | Inoue et al. ............................. | 711/154 |
| 4,376,972 | 3/1983 | Johnson et al. .......................... | 711/201 |
| 4,400,794 | 8/1983 | Koos ....................................... | 711/202 |
| 4,888,687 | 12/1989 | Allison et al. ............................ | 711/5 |
| 5,187,792 | 2/1993 | Dayan et al. ............................ | 395/725 |
| 5,210,850 | 5/1993 | Kelly et al. .............................. | 395/727 |
| 5,237,669 | 8/1993 | Spear et al. ............................. | 395/402 |
| 5,301,343 | 4/1994 | Alvarez ................................... | 395/800 |
| 5,303,360 | 4/1994 | Hilton et al. ............................ | 711/201 |
| 5,329,631 | 7/1994 | Ishibashi et al. ........................ | 395/402 |
| 5,566,309 | 10/1996 | Tamura ................................... | 395/405 |
| 5,577,221 | 11/1996 | Liu et al. ................................ | 395/427 |

OTHER PUBLICATIONS

Intel Corporation, "16–/32–Bit Embedded Processor Handbook," Year 1991, pp. 1–59—1–127.

*Primary Examiner*—Eddie P. Chan
*Assistant Examiner*—Than V. Nguyen

[57] ABSTRACT

By overlaying two memory banks to form a single, monolithic memory and setting a movable boundary point between those two banks, one can exceed the fixed addressing capability of a microprocessor. By moving the boundary, one can then access common-value memory locations in one or the other of the memory regions. The manipulation of the boundary can be performed by a microprocessor.

2 Claims, 3 Drawing Sheets

MULTIPLE MEMORY ADDRESSING USING ADJUSTABLE CHIP SELECT

CROSS-REFERENCE TO RELATED APPLICATION

This is a continuation of Ser. No. 07/990,724 filed Dec. 15, 1992 now abandoned.

FIELD OF THE INVENTION

This invention generally relates to memory addressing by microprocessors. Specifically, the invention is directed to an apparatus and method for adjusting the address limits of accessible memory.

BACKGROUND OF THE INVENTION

The amount of memory that can be addressed in a system is usually fixed by the hardware configuration and cannot be changed unless one modifies the hardware. For example, the microprocessors commonly used in personal computers have specified addressing capabilities. If one needs to exceed that limit, a solution needs to be found.

Various techniques have been devised for addressing memory in excess of the fixed limit. For example, one could provide separate memory arrays for code and data. The address in such a system would contain status bits that determine which array to access for the type of data requested. One disadvantage with separate arrays is that data and code must be segregated and special software, above and beyond the operating system and applications, is required to insure proper allocation of memory.

Another scheme is memory bank switching. Using a segment of RAM such as a 4 k or 64 k window, the microprocessor would map the address into a larger memory. Because the mapping relationship is on a one-to-one basis, the amount of memory accessible at any one time is limited to the size of the window and specifically to that which has been mapped into the window space until the mapping register is reprogrammed to direct the window space to a different memory space.

The need to address more memory than the hardware is capable of handling arises where a system has two or more dedicated memories that are addressed at different times. Without resorting to the methods described above, it would be helpful to simplify the addressing scheme.

SUMMARY OF THE INVENTION

These and other objects are achieved by the invention which provides a way around the hardware-imposed memory addressing limitations. The invention allows a computer or microprocessor to share a memory space between (in this configuration) RAM and ROM. But it also can be distributed over other forms and combinations of memory and more than two memory banks. Also, it should be understood that it is not limited to applications having a microprocessor.

The invention allows one to access memory exceeding the fixed addressing capability of the microprocessor because it overlays one memory bank on another, and permits the microprocessor to shift the boundary separating the memory banks. The overlay is accomplished by setting a boundary line and then, by changing a value in a register, moving the boundary in order to access memory locations in one or the other of the memory banks. The manipulation of the boundary can be performed by a microprocessor.

Initially, in one embodiment of the invention, the memory address range of the microprocessor begins at address 00000 in RAM and increments upward. Addressing in RAM continues as the address is incremented until the movable boundary is reached. At this point, the microprocessor is reading from ROM space until the maximum address is reached. Note that this is only one specific example of the invention. Other types and combinations of memory could be employed and some other device could be substituted for the microprocessor.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
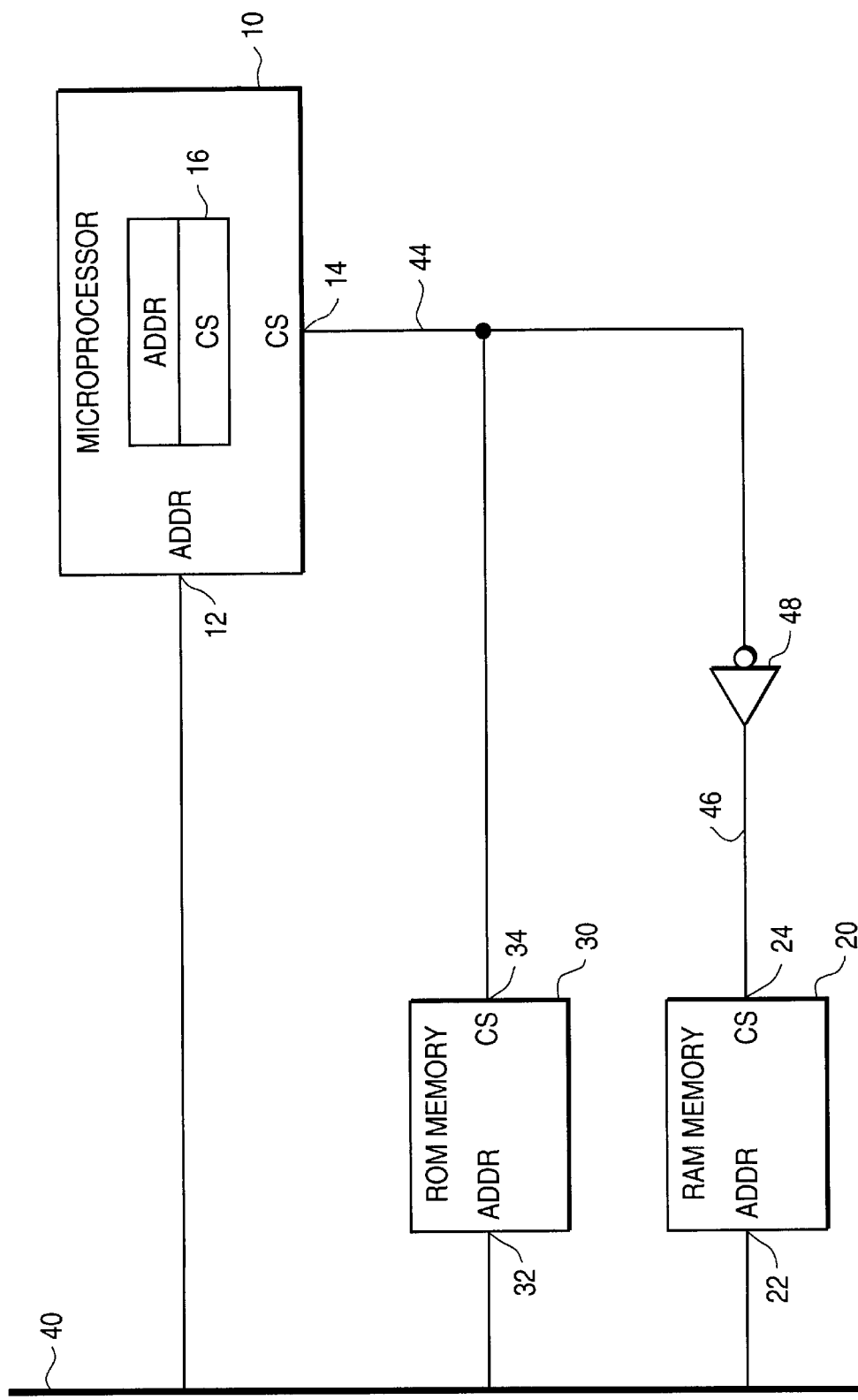
FIG. 1 is a schematic block diagram of a microprocessor, two memory modules, and circuitry for accessing the modules.

The discussion here centers around a 80186 microprocessor but any microprocessor could be used. The 80186 has a maximum addressing capability of 1 Mbyte. The microprocessor includes integrated chip select logic, which is used to enable memory and/or peripheral devices. As illustrated in FIG. 1, the microprocessor 10 has an address port 12 and a chip select port 14. Other ports, e.g., data, control, etc., are not relevant to this discussion and therefore not shown. Finally, the microprocessor 10 has an address register 16. Two locations in the register 16 are relevant here: an address value (ADDR) 50 and a chip select value (CS) 52. In this arrangement, it was convenient to use a register within the microprocessor. Nevertheless, one could store such information elsewhere. Any register so designated in the system could hold this information.

The microprocessor 10 has access to two memory banks: a 1024 kbyte RAM 20 and a 256 kbyte ROM 30. Each memory has an address input 22 or 32 and a chip select input 24 or 34. The chip select output 14 of the microprocessor 10 is connected to the ROM 30 chip select input 34 by chip select line 44. The chip select line 44 is also connected to an inverter 48 which in turn is connected to the chip select input 24 of the RAM 20. Finally, the address lines 12, 22, and 32 of the microprocessor 10, RAM 20, and the ROM 30, respectively, are interconnected by the bus 40. In this discussion, it will be assumed that the chip selects are enabled when their inputs are high.

By definition, the lower limit of addressable memory is 00000 or 00000H in hexadecimal. Given the selection of the 80186 microprocessor, the upper limit of addressable memory is 1024 kbytes or FFFFFH. In this context, the RAM 20 is designated the lower memory and the ROM 30 is designated the upper memory; both of these designations are arbitrary. With the 80186, the maximum amount of upper memory that can be addressed is 256 kbytes. Therefore, the boundary between the upper and lower memories can be set as low as C0000H.

The chip select port 14 is active when the value of ADDR in the address register 16 is less than the value of CS and, by convention, the chip select port 14 is low. Therefore, the output of the inverter 48 is high, selecting RAM 20, while ROM 30 is not selected. However, when the value of ADDR in the ADDR location 50 of the address register 16 is greater than the value in the CS location 52 of the address register 16, the chip select port 14 is high, selecting ROM 30. Since the output of the inverter 48 is now low, RAM 20 is not selected.

Figure 2:
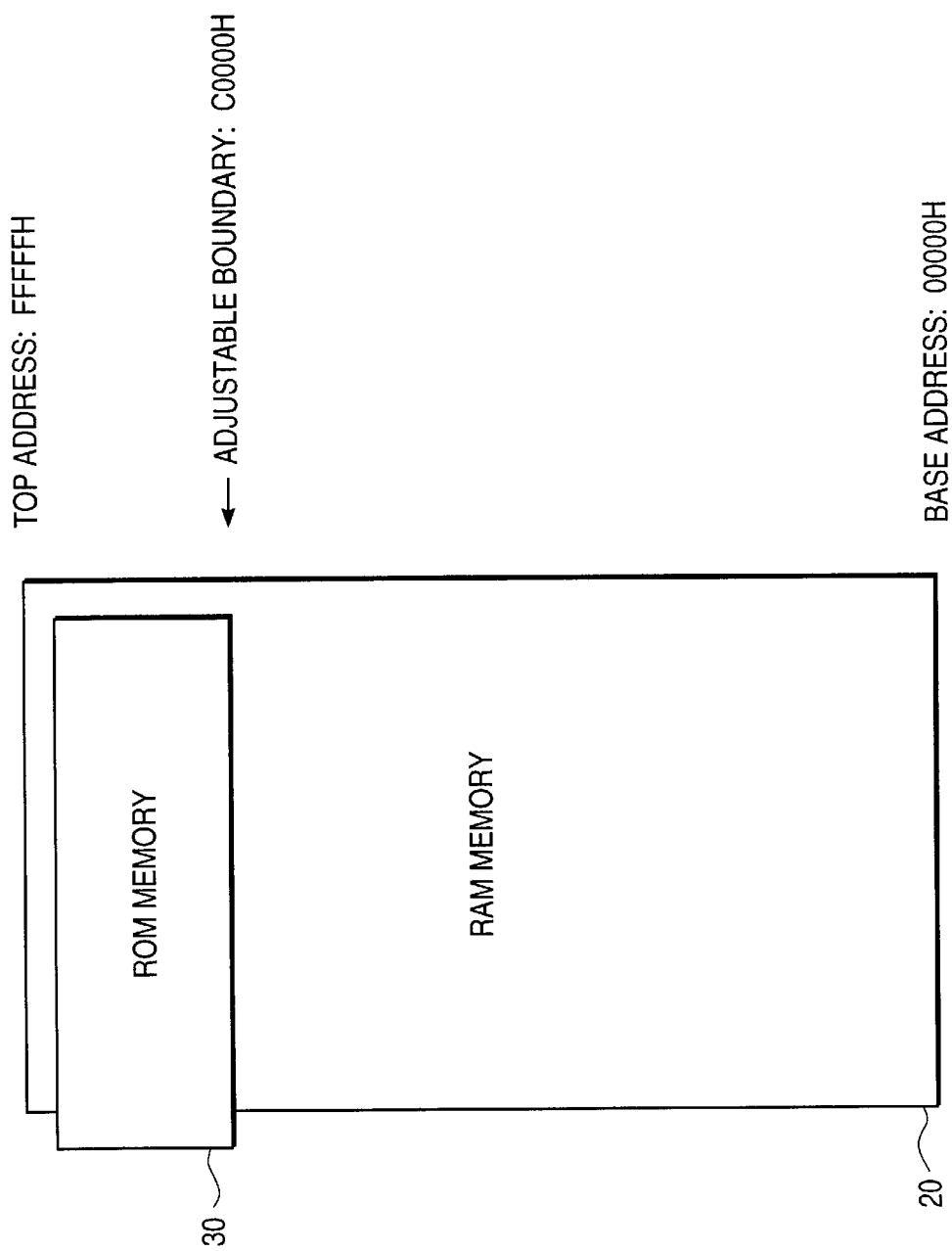
FIGS. 2 and 3 are schematic representations of the memories configured according to the invention.
Figure 3:
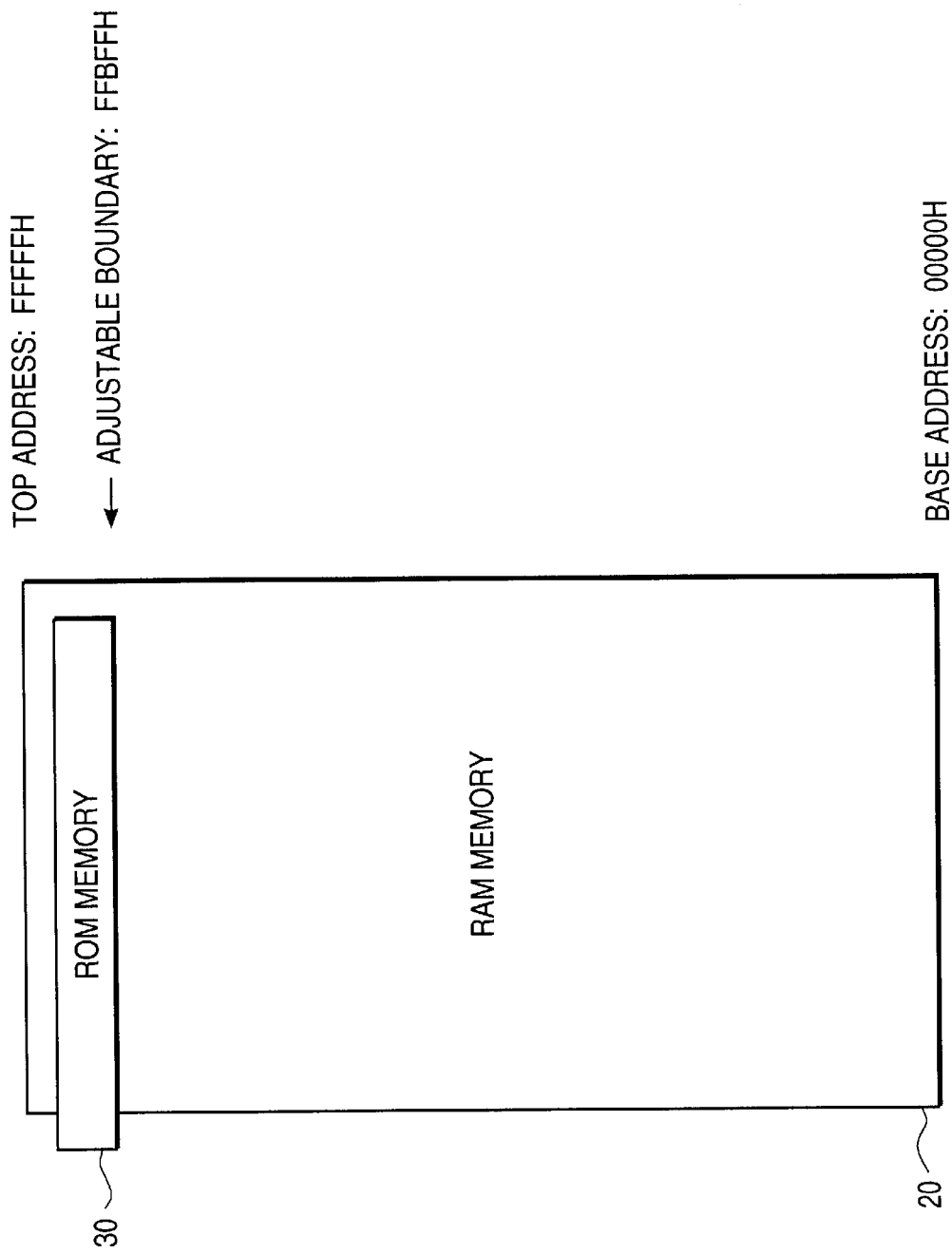

In the 80186 microprocessor 10, the value in the CS location 52 can be set to 1K, 2K, 4K, 8K, 16K, 32K, 64K, 128K, or 256 Kbytes (where K=1024). By setting the value in the CS location 52 of the address register 16 to 256K, the microprocessor will be able to access the maximum amount of ROM 30, as illustrated in FIG. 2. By setting the value in the CS location 52 to 1K, the microprocessor will be able to access less ROM 30 but the maximum amount of RAM 20, as shown in FIG. 3.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, one could use other microprocessors, as well as different types and quantities of memory. Also, the example in FIGS. 2 and 3 illustrate a boundary that lies at an intermediate address within a memory. If desired, the boundary could begin at or maximum address 00000H or at the top address.

What is claimed is:

1. A memory comprising:

a plurality of addressable memory modules, each module having a plurality of addressable memory locations;

means for determining at least one boundary corresponding to an addressable location in two of the memory modules;

means for receiving a received address for an addressable memory location in the memory modules;

comparison means for comparing the received address with the boundary, the said comparison means being responsive to the means for determining at least one boundary and the means for receiving an address; and means, responsive to the comparison means, for selectively enabling one of the modules, wherein at least some of the addressable memory locations in at least two of the memory modules share common addresses.

2. A method of selectively accessing one of a plurality of addressable memory modules, each module having a plurality of addressable memory locations, the method comprising the steps of:

determining at least one boundary corresponding to an addressable location in at least two of the memory modules;

receiving an address for an addressable memory location in the memory modules;

comparing the received address to said at least one boundary; and in response to the step of comparing the received address to said at least one boundary, selectively enabling one of the modules wherein at least some of the addressable memory locations in at least two of the memory modules share common addresses.

* * * * *